United States Patent [19]

Kyriss et al.

[11] Patent Number: 5,660,721

[45] Date of Patent: Aug. 26, 1997

[54] APPARATUS FOR TREATMENT OF WELL WATER PROVIDED THROUGH A WELL WATER SUPPLY LINE

[75] Inventors: Karl Kyriss, West Chester, Pa.; Jeffrey Careaga, Budd Lake, N.J.; Kenneth Bather; John Micolucci, both of Reading, Pa.

[73] Assignee: E-Group, L.L.C., Flanders, N.J.

[21] Appl. No.: 510,372

[22] Filed: Aug. 2, 1995

[51] Int. Cl.$^6$ .............................. B01D 17/12; B01D 19/00
[52] U.S. Cl. .................. 210/86; 96/157; 210/110; 210/188; 210/194; 210/218; 210/257.1
[58] Field of Search ........................... 210/86, 90, 103, 210/104, 110, 116, 134, 136, 137, 138, 143, 170, 188, 194, 202, 195.1, 220, 221.1, 221.2, 257.1, 258, 259, 260, 295, 320, 747, 806, 218, 257.2; 166/265, 266, 267, 370; 96/155, 156, 157, 181, 204, 206, 219, 220

[56] References Cited

U.S. PATENT DOCUMENTS

| | | |
|---|---|---|
| 2,689,018 | 9/1954 | Kittredge . |
| 2,811,258 | 10/1957 | Schleyer et al. ............... 210/257.1 |
| 3,649,532 | 3/1972 | McLean . |
| 3,784,008 | 1/1974 | Trogoline .......................... 210/220 |
| 4,508,545 | 4/1985 | DeLoach ............................. 96/181 |
| 4,526,692 | 7/1985 | Yohe et al. ........................ 210/747 |
| 4,582,610 | 4/1986 | Baker ................................. 210/747 |
| 4,608,163 | 8/1986 | Yohe et al. ........................ 210/150 |
| 4,659,463 | 4/1987 | Chandler et al. ................. 210/202 |
| 4,756,724 | 7/1988 | Yuill .................................. 55/165 |
| 4,798,034 | 1/1989 | Jarnagin et al. .................. 52/169.5 |
| 4,843,786 | 7/1989 | Walkinshaw et al. ............ 52/169.5 |
| 4,869,832 | 9/1989 | Lamarre ............................ 210/747 |
| 4,957,394 | 9/1990 | Jarnagin et al. .................. 405/128 |
| 4,988,237 | 1/1991 | Crawshaw ......................... 405/229 |
| 5,003,750 | 4/1991 | Delgado ............................ 52/742 |
| 5,045,215 | 9/1991 | Lamarre ............................ 210/747 |
| 5,100,555 | 3/1992 | Matson ............................. 210/651 |
| 5,104,554 | 4/1992 | Dempsey .......................... 210/747 |
| 5,107,642 | 4/1992 | Mogstad .......................... 52/169.5 |
| 5,143,606 | 9/1992 | Bernhardt ......................... 210/170 |
| 5,147,530 | 9/1992 | Chandler et al. ................. 210/170 |
| 5,149,343 | 9/1992 | Sowinski ............................ 55/66 |
| 5,194,158 | 3/1993 | Matson ............................. 210/651 |
| 5,279,746 | 1/1994 | Ziol .................................. 210/750 |
| 5,354,459 | 10/1994 | Smith ............................... 210/188 |
| 5,403,234 | 4/1995 | Kuypers ............................ 454/345 |

*Primary Examiner*—Joseph W. Drodge
*Attorney, Agent, or Firm*—Sperry, Zoda & Kane

[57] ABSTRACT

An apparatus for removing undesirable compounds such as radon, volatile organics, hydrogen sulfide, carbon dioxide and methane from contaminated well water which utilizes a recirculating system which is selectively operable to decrease the contamination of the treated water below a given level wherein the contaminant removal is achieved by providing an interface between the radon contaminated water and air in order to allow the undesirable compounds such as radon, volatile organics, hydrogen sulfide, carbon dioxide and methane to move from the water into the air due to the greater affinity therefore. The apparatus is designed to be used with a conventional residential or small commercial water well supply system and maximizes radon removal preferably by aspirating or baffling a gravity feed radon removal system for water which may include passing thereof through mass transfer packing material. The apparatus includes an automated system for monitoring the level of accumulated treated water to further facilitate contaminant removal.

20 Claims, 1 Drawing Sheet

APPARATUS FOR TREATMENT OF WELL WATER PROVIDED THROUGH A WELL WATER SUPPLY LINE

BACKGROUND OF THE INVENTION

1. Field of the Invention

The present invention is pertinent to the field of devices for treatment of air, water and ground areas and removal of contaminants therefrom. More particularly the present invention is designed for the removal of undesirable compounds such as radon, volatile organics, hydrogen sulfide, carbon dioxide and methane from such areas. Furthermore the present invention specifically deals with the treatment of well water and the removal of unwanted compounds such as radon, volatile organics, hydrogen sulfide, carbon dioxide and methane from well water and, in particular, well water used as a supply of water for new or existing residential or small commercial applications. Such typical small systems as currently used include a well pump along with a pressure switch, a water storage tank and a well water supply line. The present invention is designed to be usable with such conventional small commercial or residential systems in order to achieve removal of radon and other unwanted compounds such as volatile organic compounds, hydrogen sulfide, carbon dioxide and methane to below the acceptable levels from well water.

2. Description of the Prior Art

Numerous prior art devices have been design for treatment of and removing contaminants from water such as U.S. Pat. Nos. 2,689,018 issued to Kittredge; and 4,526,692 issued Jul. 2, 1985 to T. Yohe et al on a "Process For Purification Of Contaminated Groundwater"; and U.S. Pat. No. 4,582,610 issued Apr. 15, 1986 to M. Baker on a "Well Water Aeration System"; and U.S. Pat. No. 4,608,163 issued Aug. 26, 1986 to T. Yohe et al on an "Apparatus For Purification Of Contaminated Groundwater"; and U.S. Pat. No. 4,756,724 issued Jul. 12, 1988 to G. Yuill on "Extracting Radon Gases From A Domestic Water Supply"; and U.S. Pat. No. 4,798,034 issued Jan. 17, 1989 to J. Jarnagin et al and assigned to Safe Aire, Inc. on a "Method And Apparatus For Collecting And Discharging Radon Gas And Fluids"; and U.S. Pat. No. 4,843,786 issued Jul. 4, 1989 to D. Walkinshaw et al on an "Enclosure Conditioned Housing System"; and U.S. Pat. No. 4,869,832 issued Sep. 26, 1989 to B. Lamarre and assigned to North East Environmental Products, Inc. on a "Radon Removal Method"; and U.S. Pat. No. 4,957,394 issued Sep. 18, 1990 to J. Jarnagin et al and assigned to Radon Home Products, Inc. on a "Method And Apparatus For Sub-Floor Collection And Disposal Of Radon Gas"; and U.S. Pat. No. 4,988,237 issued Jan. 29, 1991 to G. Crawshaw on a "Soil Gas Reduction System"; and U.S. Pat. No. 5,003,750 issued Apr. 2, 1991 to A. Delgado on a "Method For Reducing Immunogenic And/Or Toxic Substances In Indoor Air"; and U.S. Pat. No. 5,045,215 issued Sep. 3, 1991 to B. Lamarre and assigned to North East Environmental Products, Inc. on "Removing Hazardous Contaminants From Water"; and U.S. Pat. No. 5,100,555 issued Mar. 31, 1992 to S. Matson on a "Method And System For Removing Radon From Radon Containing Water"; and U.S. Pat. No. 5,104,554 issued Apr. 14, 1992 to J. Dempsey and assigned to Aqua-Rid, Inc. on "Removing Radon By Downhold Sparging Of Air"; and U.S. Pat. No. 5,107,642 issued Apr. 28, 1992 to T. Mogstad and assigned to Isola A/S on an "Arrangement In Screening Of Objects, Especially Residential Houses"; and U.S. Pat. No. 5,143,606 issued Sep. 1, 1992 to B. Bernhardt and assigned to IEG Industrie-Engineering GmbH on an "Arrangement For Cleaning Contaminated Ground Water"; and U.S. Pat. No. 5,149,345 issued Sep. 22, 1992 to R. Sowinski on a "Method For Filtering Radon From A Gas Stream"; and U.S. Pat. No. 5,194,158 issued Mar. 16, 1993 to S. Matson on a "Radon Removal System And Process";and U.S. Pat. No. 5,279,746 issued Jan. 18, 1994 to D. Ziol on a "Process And Apparatus For Removing Radon From Water"; and U.S. Pat. No. 5,403,234 issued Apr. 4, 1995 to F. Kuypers on a "Radon Gas Evaluation System And Method".

SUMMARY OF THE INVENTION

The present invention provides an improved apparatus which is useful for the removal of undesirable compounds from well water which may include radon above acceptable levels. Such well water is normally provided through a well water supply line.

The present invention includes a main water valve positioned within the well water supply line in such a manner as to be adapted to selectively prevent any water flow therethrough if necessary. This main water valve may also provide a means for bypassing the removal system whenever it is under service.

The apparatus of the removal system includes a water intake line which is in fluid flow communication with the well water supply line at a positioned upstream from the main water valve. In this manner the water intake line is adapted to receive untreated well water supplied directly from the well and may include a strainer thereinto facilitate the initial step of cleaning of the untreated well water.

A water intake valve is preferably positioned within the water intake line in order to allow stopping or starting of water flow through the water intake line under various conditions as desired. Also a water intake flow control means may be positioned within the water intake line in order to allow controlled flow of untreated water therethrough from the well water supply line and also to prevent opposite flow therethrough. As such this one-way water intake flow control device can include a one-way valve as well as a flow volume control means or any combination which achieves both the one-way restriction and the flow monitoring control. Such a configuration can take the form of a single one-way water intake flow control unit.

The removal unit of the present invention includes a removal housing defining a removal chamber therein. The removal housing defines a water inlet connected in fluid flow communication with respect to the water intake line and with respect to the removal chamber. This water inlet is adapted to receive untreated water from the water intake line and supply it to the removal chamber. A water outlet may also be included in fluid flow communication with respect to the removal chamber in such a manner as to receive treated water therefrom.

An air inlet may be included in fluid flow communication with respect to the removal chamber in such a manner as to supply air thereto to facilitate removal of undesirable compounds such as radon, volatile organics, hydrogen sulfide, carbon dioxide and methane from the water. An air outlet may also be included in fluid flow communication with respect to the removal chamber in such a manner as to receive contaminated air therefrom for exhausting as required.

The specific apparatus for removal may be positioned within the removal chamber in the removal housing between the air inlet and the air outlet and also between the water inlet and the water outlet in such a manner as to facilitate treatment of water passing therethrough. This removal unit will be adapted to remove radon or other unwanted compounds from the untreated water supplied through the water inlet and urge the treated water to exit through the water outlet. The removal means will also be adapted to place the removed unwanted contaminants into the air supplied through the air inlet and to urge it to exit through the air outlet.

The removal means has been found to operate more efficiently when it includes an aspiration valve or similar configuration designed for aspirating or spraying of the untreated water supplied from the water inlet in such a manner as to maximize the transfer of compounds from water to air achievable within the radon removal chamber. Such aspiration also tends to raise the pH value of the treated water for softening thereof and reduce corrosive properties. The aspiration means increases the intimate contact between the air and the water thereby taking advantage of the greater affinity of radon or other unwanted compound for air and encouraging it to pass from the water into the air. The removal apparatus may also include a baffle device positioned within the aspiration means to receive aspirated water therefrom by gravity flow and to further facilitate contact between the aspirated water and the air in such a manner as to urge movement of unwanted compounds such as radon, volatile organics, hydrogen sulfide, carbon dioxide and methane from the water into the air while traveling through the removal unit.

A clearwell water accumulator is preferably positioned within the removal housing in fluid flow communication with respect to the removal means and the water outlet thereof and located therebetween preferably. This clearwell water accumulator is preferably positioned in such a manner as to receive treated water from the removal device for accumulating and forming a reservoir for supplying of such treated water to the water outlet.

The apparatus of the present invention further includes a water return line in fluid flow communication with the water outlet in such a manner as to receive treated water therefrom. This water return line is in fluid flow communication with respect to the well water supply line at a position downstream from the main water valve in such a manner as to enhance the supply of treated water thereto. Furthermore a water return valve may be included positioned within the second water line for selectively controlling water flow therethrough and if necessary stopping all flow or allowing full flow based on operating conditions.

A recirculating line is preferably included with respect to the configuration of the present invention. Such a recirculating line will preferably extend between the water return line and the water intake line and will allow fluid flow communication therebetween. This water return line will be designed to receive treated water from the water outlet and pass it to the water intake line for further treating thereof.

The present invention may further include a one-way recirculating flow control valve positioned within the recirculating line to control the amount of water flow through the recirculating line and to allow the flow of treated water from the water return line to the recirculating line and further into the water intake line for further treatment thereof. This one-way recirculating flow control valve means is preferably adapted to prevent flow from the water intake line through the recirculating line into the water return line.

An exhaust air line may be included in fluid flow communication with respect to the air outlet of the removal housing such as to be adapted to receive contaminated air therefrom. An exhaust fan or blower may be positioned within the exhaust air lines and in fluid flow communication therewithin order to facilitate the movement of air therethrough and the exhausting of such contaminated air. The exhaust blower will also create a pressure within the removal chamber that is less than atmospheric pressure to facilitate controlled exhausting of the unwanted compounds.

A reservoir may be included for accumulating treated water. This reservoir can be defined as the treated water bladder tank preferably positioned within the water return line upstream of the recirculating line for facilitating the accumulation of treated water. A booster pump may be positioned within the water return line between the water outlet of the removal unit and the treated water bladder tank to facilitate flow through the recirculating line and to further facilitate the maintaining of significant water pressure of the treated water within the water return line. A pressure switch may be operatively connected with respect to the booster pump to selectively initiate and terminate operation thereof responsive to monitoring of water pressure within the water return line. When the pressure falls below a given level the pressure switch can initiate operation of the booster. Once the pressure has reached a predetermined upper level the pressure switch can terminate operation of the booster pump.

The apparatus of the present invention can also be usable in association with any conventional radon air removal apparatus. Any type of a supplementary apparatus for removal of undesirable compounds such as radon from air can be used efficiently in association with the present invention since the present invention can be used in those situations where the supply of air entering through the air inlet is itself radon contaminated air. The affinity of radon for air is so great that the use of radon contaminated air to interface with the contaminated water to remove radon therefrom will not suffer any loss of efficiency merely because of a slightly higher concentration of radon within the air supply. For this reason any conventional system usable for removing radon from air is particularly usable in association with the system of the present invention designed for the removal of radon from water.

The apparatus of the present invention is particularly advantageous when used in association with a water level sensing device which is positioned preferably within the clearwell water accumulator in order to facilitate monitoring of the level of water accumulated therein. This water level sensing device is responsive to sensing of water reaching a high level mark within the clearwell water accumulator to generate an alarm condition and thereby cease water flow through the water intake line and the recirculating line until the water level sensing means senses that a normal low water level has been reached within the clearwell water accumulator.

The water level sensing device of the present invention may further be responsive to the sensing of low water level within the clearwell water accumulator to allow water to flow through the water intake line and the recirculating line in order to facilitate the flow of water into the removal device and movement thereof into the clearwell water accumulator.

A controller device may also be included with the present invention which is operative to the sensing of a normally high water level by the water level sensing means to terminate water flow through the water intake line and to allow water flow through the water recirculating means in such a manner as to facilitate further unwanted contaminant removal from the treated water. This control device may further include a time delay apparatus operative to initiate operation responsive to the water level sensing device noting that a normally high water level has been reached and being responsive at that point to terminate operation at a predetermined time thereafter. This control means is preferably responsive to termination of operation of the time delay to terminate water flow through the recirculating line in such a manner as to facilitate supplying of treated water to the water return line.

It is an object of the present invention to provide an improved apparatus for treatment from well water provided through a well water supply line wherein total capital cost is minimized.

It is an object of the present invention provide an improved apparatus for treatment of well water provided through a well water supply line wherein use with a new or existing residential or small commercial well water supply is possible.

It is an object of the present invention to provide an improved apparatus for treatment of well water provided through a well water supply line wherein bypass valving is provided to maintain water supply during maintenance of the contaminant treating apparatus.

It is an object of the present invention to provide an improved apparatus for treatment of well water provided through a well water supply line wherein maintenance costs are minimized.

It is an object of the present invention to provide an improved apparatus for treatment of well water provided through a well water supply line wherein down time is minimized.

It is an object of the present invention to provide an improved apparatus for treatment of well water provided through a well water supply line wherein use with a typical small well water system including a well pump, pressure responsive switch and water storage bladder is possible.

It is an object of the present invention to provide an improved apparatus for treatment of well water provided through a well water supply line wherein only a minimum amount of modification is required to the existing well water supply system.

It is an object of the present invention to provide an improved apparatus for treatment of well water provided through a well water supply line wherein usage with an adjacently positioned system for radon or other contaminated air is particularly advantageous and possible.

It is an object of the present invention to provide an improved apparatus for treatment of well water provided through a well water supply line wherein a recirculation line is included to allow more accurate control on the reduction of concentration of unwanted compounds such as radon, volatile organics, hydrogen sulfide, carbon dioxide and methane within water is made possible.

BRIEF DESCRIPTION OF THE FIGURE

While the invention is particularly pointed out and distinctly claimed in the concluding portions herein, a preferred embodiment is set forth in the following detailed description which may be best understood when read in connection with the accompanying figure, in which:

DETAILED DESCRIPTION OF THE PREFERRED EMBODIMENT

Figure 1:
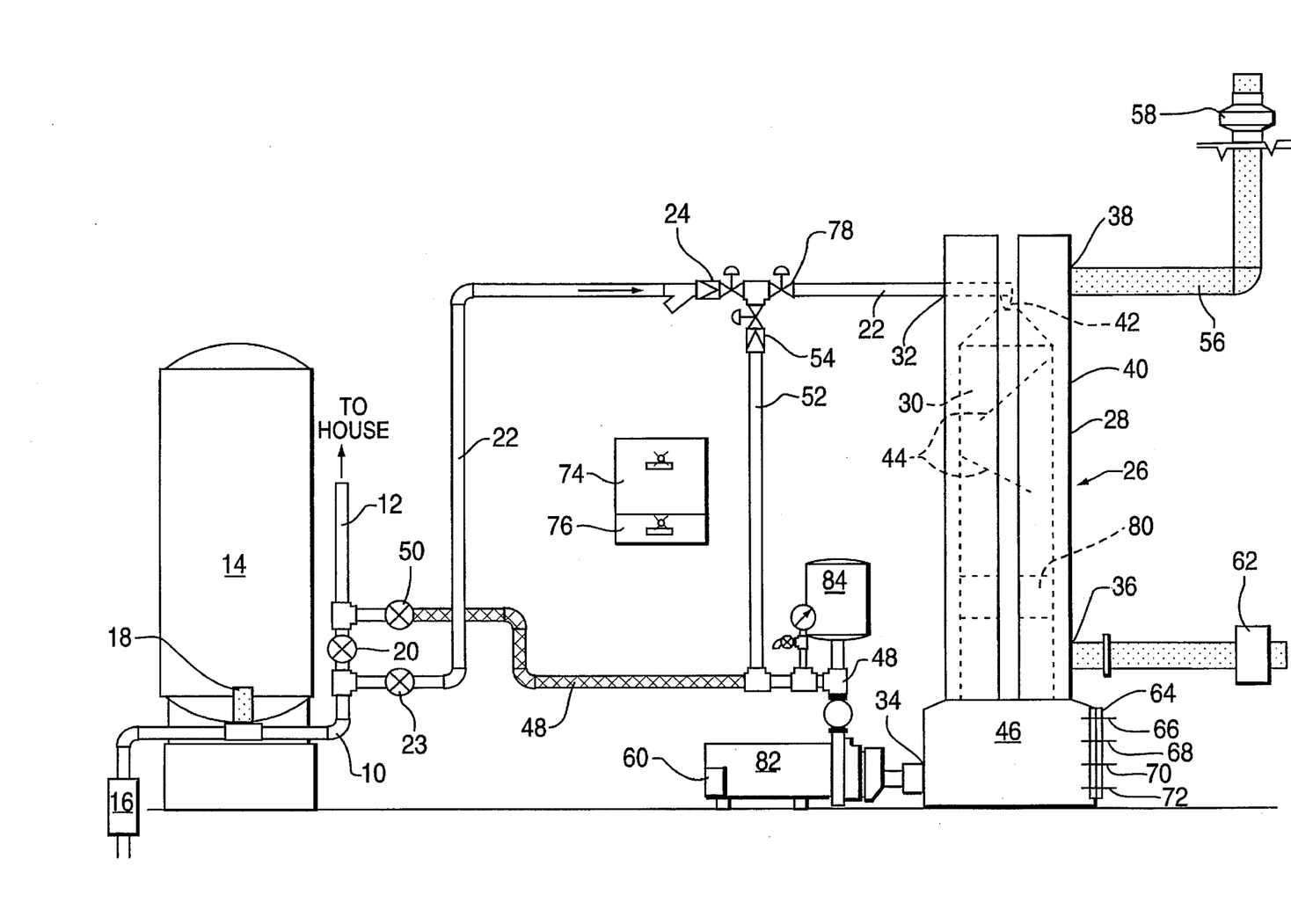
The figure shows a schematic illustration of an embodiment of the improved apparatus for removal of undesirable compounds such as radon, volatile organics, hydrogen sulfide, carbon dioxide and methane from well water of the present invention.

The present invention provides an apparatus for removal of undesirable compounds such as radon, volatile organics, hydrogen sulfide, carbon dioxide and methane from a typical residential or small commercial system. Such conventional systems include a well water supply line 10 which is connected to a well pump 16 which is adapted to pump untreated well water into a main bladder tank 14. A well pressure switch 18 may be positioned within or adjacent the bladder to monitor the water level therein to maintain a minimum water level. Well water is then carried through a house line 12 to a household for conventional water usage purposes.

The apparatus of the present invention includes a main water valve means 20 which is positioned within the well water supply line 10. Main water valve means 20 is movable to a closed positioned for operation of the removal apparatus of the present invention and is movable to an open position for bypassing thereof. A water intake line means 22 is connected to the well water supply line 10 at a position upstream from the location of the main water valve means 20. This water intake line 22 is adapted to take untreated well water from the well water supply line 10 and make it available for treatment by the removal apparatus of the present invention. A one-way water intake flow control 24 is preferably positioned in the water intake line 22. This flow control 24 is adapted to modify the amount of low of liquid through line 22 while at the same time preventing reverse flow therethrough. The one-way water intake flow control 24 will only allow the flow of water from the well water supply line 10 toward the contaminant removal apparatus of the present invention and is capable of modifying the amount of flow therethrough.

The removal unit 26 of the present invention includes a removal housing 28 defining a removal chamber 30 therein. The removal chamber 30 is in fluid flow communication with respect to a water inlet 32. Water inlet 32 is also in fluid flow communication with respect to the water intake line 22 such as to receive untreated well water therefrom. Water inlet 32 allows the untreated water from the well water supply line 10 traveling through the intake line 22 to pass therethrough and enter the removal chamber 30. A water outlet 34 is also defined in the removal housing 28 to allow treated water to exit from the position of contaminant removal treatment.

In a similar manner the removal housing 28 includes an air inlet 36 adapted to receive air therein and an air outlet 38 adapted to expel and exhaust air outwardly therefrom. Air inlet 36 and air outlet 38 are both in fluid flow communication with respect to the removal chamber 30 defined therein. In operation the purpose of the removal unit 26 is to transfer unwanted compounds such as radon, volatile organics, hydrogen sulfide, carbon dioxide and methane from the water passing from water inlet 32 to water outlet 34 to the air which is traveling between the air inlet 36 and the air outlet 38. In this manner the water will be treated and the air can be expelled through an exhaust line 56 which preferably includes an exhaust fan or blower means 58 therein which are both in fluid flow communication with respect to the air outlet 38 to draw contaminated air therefrom for disposal or expelling as required. Blower 58 is preferably operative to reduce the pressure within the removal chamber 30 to a value less than ambient pressure to minimize the chance or re-contaminating backflow and to encourage efficient exhausting of unwanted compounds.

The specific removal means 40 of the present invention preferably includes an aspiration or spraying means 42 which is adapted to aspirate or spray the water immediately after passing through the water inlet 32 into the removal chamber 30. This aspiration means is preferably pointed in a downward direction and is useful to increase the interface or contact between the untreated water and the air within the removal chamber 30.

It is preferable that the removal device 40 also include a plurality of baffles 44 which are designed to deflect the downwardly aspirated water in such a manner as to further increase interfacing thereof with the air to enhance the movement of undesirable compounds such as radon, volatile organics, hydrogen sulfide, carbon dioxide and methane from the water to the air within the removal chamber 30.

The downward movement of the water through the removal device 40 is normally propelled primarily by gravitational flow downwardly. During this path of movement from the water inlet 32 downwardly the removal means 40 is designed to maximize the contact between the air and water. One of the means of maximizing this contact is by providing a packing 80 optionally within the removal chamber 30 which further aids in removal of undesirable compounds such as radon, volatile organics, hydrogen sulfide, carbon dioxide and methane from the water passing therethrough.

Preferably an accumulator such as a clearwell accumulator means 46 will be positioned immediately below the removal means 40. Clearwell accumulator 46 is designed to accumulate treated water therein and preferably include a water level sensing means 64 positioned therein for monitoring the level of treated water. The water level sensing means is specifically designed to monitor water at the high level 66, normally high level 68, normal low level 70 and low level 72.

After the treated water passes through the water outlet 34 it preferably travels into a water return line 48 which is connected to the well water supply line 10 at a position downstream of the main water valve 20. In this manner treated water can be reintroduced into the well water supply line 10 such that it can be provided to the house line 12 directly to the house for various utility purposes.

Water return line 48 preferably includes a water return valve 50 therein to monitor flow therethrough and is movable to a fully closed position to stop any flow therethrough as desired. In a similar manner the water intake line 22 can include a water intake valve 23 which is operative to move to a fully closed position usually only during times of maintenance of the system. Thus, with this configuration, when the system is fully operating valve 20 will be closed and valves 23 and 50 will be open. On the other hand, when maintenance of the system is occurring, valves 23 and 50 will be closed and valve 20 will be open to allow water supply through the well water supply line 10 to continue even during such times of contaminant system maintenance.

The configuration of the present invention preferably further includes a recirculating line 52 which extends from the water return line 48 to the water intake line 22 at a position downstream of the one-way water intake flow control 24. In this manner the treated water exiting the water outlet 34 can travel through the recirculating line 52 to be reintroduced into the water intake line 22 for recirculation, hence, retreatment thereof. In this manner the radon level or the level or any other unwanted contaminants within the treated water can be brought below any desired level.

Operation of the recirculation line 521 is controlled by a one-way recirculating flow control valve 54 positioned therein. This flow control valve 54 is one-way and in this manner prevents back flow of water at any time from the water intake line 22 to the water return line 48. The one-way portion of the recirculating flow control valve 54 does allow the flow of water in the other direction from the water return line 48 to the water intake line 22. However, this flow control can be modified in the amount of flow allowed by adjustment of the valve 54.

To enhance operation of the apparatus of the present invention a booster pump 82 may be positioned within the water return line 48 at a location upstream from the recirculating line 52. Booster pump 82 is operatively secured with respect to a pressure switch 60 which monitors the pressure within the water return line 48. The booster pump 82 is operable to pump treated water through the recirculating line 52 into the water intake line 22 for retreatment thereof. Alternatively, if the one-way recirculating flow control valve 54 is closed, booster pump 82 is operable to increase the water pressure within the water return line 48 or to accumulate treated water within a treated water accumulation or bladder tank 84. This bladder tank 84 preferably is also positioned within the water return line 48 at a position between the booster pump 82 and the point at which the recirculating line 52 branches off.

The apparatus of the present invention is particularly usable with an adjacently positioned radon air removal system generally depicted by reference numeral 62. Such a system is designed to remove radon from air in an area normally positioned in some area fairly close or somewhat adjacent to the contaminant water removal system of the present invention. The specific configuration of the system for removing radon or other contaminants from air 62 can be of any chosen design whatsoever. The present invention is designed to be connected to the contamination output of the radon air removal means 62 such that the contaminated air is utilized by the apparatus of the present invention as the intake of air for removal of radon gas from the water. It is possible to use radon contaminated air as the source of air for the removal means 26 of the present invention because of the high affinity of radon and other volatile contaminants for air over water. The slight additional contamination level of radon or other volatile contaminant within even fairly highly contaminated air has a very minor effect on the efficiency of radon removal by the removal unit 26 of the present invention. Since the presence of radon within water in a given geographic area has been found to be prevalent in those locations where radon is also present within the air of basements and other enclosures, the design of the present invention is particularly usable for combining two such systems, that is, a radon air removal system and a radon water removal system both of which can be operated efficiently by providing the output of the contaminated air from the radon air removal system as the input to air inlet 36 of the water removal system of the present invention.

The apparatus of the present invention further preferably includes a control means 74 which is operable to monitor and control operation of the various flow control valves and operating valves as well as the water level sensing means 64 and the booster pump 82. Control panel 74 preferably includes a time delay means 76 which is specifically useful for determining the length of time during which the apparatus of the present invention will be run solely under the recirculation mode to continuously treat the same water and gradually reduce the radon or other contamination thereof by constant recirculation through the removal unit 26. This is achieved by maintaining the one-way recirculating flow control valve 54 in the open position.

An additional solenoid valve 78 has been found advantageous to include in the apparatus of the present invention in order to insure that there will be no flow of additional water through the water inlet 32 when no such flow is desired. The same operating conditions can be assumed by positioning the one-way intake flow control 24 and the one-way recirculating flow control valve 54 in the closed position. However, solenoid valve 78 has been found to be efficient in operation in the backup mode.

One specific advantage of the present invention is in the possibility of operation in the retreatment or recycling mode wherein the recirculation line 52 and the valve 54 therein is in a completely open position. In this manner water will be continuously recycled through the removal chamber 30 for continuous retreatment thereof. This has been found to be able to reduce contamination levels to much lower levels than in prior art systems and also has been found to be able to effectively treat and reduce contamination in those water supplies having extremely high concentration levels of as much as two to three times those normally occurring naturally.

One of the particular advantages of the present invention has been shown by the use of the exhaust blower 58 which creates a negative pressure for the movement of air within the removal chamber 30 in such a manner as to have a gradual air flow vertically upward through the housing. This type of air movement has been found to maximize the removal of unwanted compounds such as radon, volatile organics, hydrogen sulfide, carbon dioxide and methane from the water aspirated downwardly through housing 28 and to minimize any possibility of re-contaminating backflow.

When the water level sensing means 64 senses the water at the low positions 70 and 72 the valves 23, 50 and optional valve 78 will all open. It is also necessary that exhaust fan 58 is operating at this time. In this manner water will begin to flow from the well water supply line 10 past the water intake valve 23 through water intake line 22 and through the flow control means 24 to the water intake 32 for treatment. The water will then pass through the aspirating nozzle 42 and will flow by gravity downwardly past baffles 44 and packing material 80 and will come to rest within the clearwell accumulator 46. The water will continue to flow in this manner until the water level reaches the normally high waterlevel position 68, at which point one-way water intake flow control 24 will close in order to stop any additional water from entering through the water inlet 32. However, the one-way recirculating flow control valve 54 and the optional solenoid valve 78 will remain open to allow treated water to be recirculated through line 52 powered by the booster pump 82 in a continuous manner until the required low level of contamination within the water has been reached. The control means 74 can preferably include a time delay means 76 which will achieve a fixed time for recirculating which can be varied depending upon the concentration of undesirable compounds such as radon, volatile organics, hydrogen sulfide, carbon dioxide and methane in the area in which the apparatus of the present invention is used. However, the time delay 76 within the control panel 74 will control the length of time of recirculation based on the level of treatment required. Once the recirculation period has ended the control means 74 will close valves 54 and optional valve 78. The booster pump 82 will continue to pump to build up the pressure and reservoir of treated water within bladder tank 84 and can at that point start to provide the treated water through water return line 48 as desired.

If for some reason the high water level point 66 is sensed within the clearwell accumulator 46 by the water level sensing means 64, then an alarm condition will exist and will be initiated within the control panel. Under such alarm conditions the valves 23, 54 and optionally 78 will all close and will not re-open until the water level sensing means 64 senses a normal low water level 70 within the clearwell accumulator 46.

With this apparatus a fully functional well water treatment system is disclosed which can be operated in a recirculation mode to reduce contaminant concentration levels to any low level as desired merely by varying the time of operation in the recirculating mode. Also, the water treatment system of the present invention is particularly useful in association with a radon air removal system 62 of any standard or other conventional design.

While particular embodiments of this invention have been shown in the drawings and described above, it will be apparent, that many changes may be made in the form, arrangement and positioning of the various elements of the combination. Inconsideration thereof it should be understood that preferred embodiments of this invention disclosed herein are intended to be illustrative only and not intended to limit the scope of the invention.

I claim:

1. An improved apparatus for treatment of well water by removal of unwanted compounds therefrom, constructed for use with a well water supply line, comprising:
   A. a main water valve means constructed to be positioned within the well water supply line and adapted to selectively prevent fluid flow therethrough;
   B. a water intake line means for fluid flow communicating with the well water supply line at a position upstream of said main water valve means and adapted to receive untreated well water supplied therefrom;
   C. a water intake valve means positioned within said water intake line means to selectively allow and prevent fluid flow therethrough;
   D. a removal unit including:
      (1) a removal housing means defining a removal chamber means therein, said removal housing means including;
         (a) a water inlet means connected in fluid flow communication with respect to said water intake line means and with respect to said removal chamber means, said water inlet means being adapted to receive untreated water from said water intake line means and supply same to said removal chamber means;
         (b) a water outlet means in fluid flow communication with respect to said removal chamber means and adapted to receive treated water therefrom;
         (c) an air inlet means in fluid flow communication with respect to said removal chamber means and adapted to supply air thereinto;
         (d) an air outlet means in fluid flow communication with respect to said removal chamber means and adapted to receive air therefrom for exhausting;
      (2) a removal means positioned within removal chamber means in said removal housing means between said air inlet means and said air outlet means and also between said water inlet means and said water outlet means for treatment of water passing therebetween, said removal means adapted to remove undesirable volatile compounds selected from the group consisting of radon, volatile organics, hydrogen sulfide, carbon dioxide and methane from the untreated water supplied through said water inlet means and urge the treated water to exit through said water outlet means, said removal means also adapted to place the removed unwanted compounds selected from the group consisting of radon, volatile organics, hydrogen sulfide, carbon dioxide and methane into the air supplied through said air inlet means and urge same to exit through said air outlet means;

E. a water return line means, in fluid flow communication with said water outlet means to receive treated water therefrom, for fluid flow communicating with respect to the well water supply line at a position downstream of said main water valve means and adapted to supply treated water thereto;

F. a water return valve means positioned within said second water line means to selectively allow and prevent fluid flow therethrough; and G. a recirculating line means extending between said water return line means and said water intake line means, said recirculating line means being in fluid flow communication with respect to said water return line means to receive treated water therefrom and in fluid flow communication with respect to said water intake line means to supply treated water thereto; and H. a one-way valve means positioned within said recirculating line means to allow flow of treated water from said water return line means into said recirculating line means and further into said water intake line means for further treatment thereof, said one-way valve means being adapted to prevent flow from said water intake line means through said recirculating line means into said water return line means.

2. An improved apparatus for treatment of well water by removal of unwanted compounds therefrom, for use with a well water supply line, as defined in claim 1 further comprising a recirculating flow control valve means positioned within said recirculating line means to control the amount of flow therethrough in order to control further water treatment.

3. An improved apparatus for treatment of well water by removal of unwanted compounds therefrom, for use with a well water supply line, as defined in claim 2 wherein said one-way valve means and said recirculating flow control means are integrally formed with respect to one another and comprise a one-way recirculating flow control means.

4. An improved apparatus for treatment of well water by removal of unwanted compounds therefrom, for use with a well water supply line, as defined in claim 1 wherein said removal means includes an aspiration means for aspirating of untreated water supplied through said water inlet means for maximizing removal of undesirable volatile compounds selected from the group consisting of radon, volatile organics, hydrogen sulfide, carbon dioxide and methane from water to air by said removal means within said removal chamber means.

5. An improved apparatus for treatment of well water by removal of unwanted compounds therefrom, for use with a well water supply line, as defined in claim 1 wherein said removal means includes baffle means to facilitate contact between the untreated water and the air to urge movement of undesirable volatile compounds selected from the group consisting of radon, volatile organics, hydrogen sulfide, carbon dioxide and methane from the water into the air traveling therethrough.

6. An improved apparatus for treatment of well water by removal of unwanted compounds therefrom, for use with a well water supply line, as defined in claim 1 further comprising a one-way water intake flow control means positioned within said water intake line means at a position upstream of said recirculating line means to allow controlled flow of untreated water therethrough from the well water supply line and to prevent opposite flow therethrough.

7. An improved apparatus for treatment of well water by removal of unwanted compounds therefrom, for use with a well water supply line, as defined in claim 1 further comprising an exhaust air line means extending from said air outlet means and an exhaust fan means positioned within said exhaust air line means to facilitate exhausting of air therefrom and to lower pressure within said removal chamber means below ambient atmospheric pressure.

8. An improved apparatus for treatment of well water by removal of unwanted compounds therefrom, for use with a well water supply line, as defined in claim 1 further comprising a radon air removal means in fluid flow communication with respect to said air inlet means of said removal unit, said radon air removal means being adapted to remove radon from a contaminated area and supply the radon contaminated air to said air inlet means to facilitate exhausting thereof.

9. An improved apparatus for treatment of well water by removal of unwanted compounds therefrom, for use with a well water supply line, as defined in claim 1 further comprising a treated water bladder tank means positioned within said water return line means upstream of said recirculating line means to accumulate a reservoir of treated water.

10. An improved apparatus for treatment of well water by removal of unwanted compounds therefrom, for use with a well water supply line, as defined in claim 9 further comprising a booster pump means positioned within said water return line means between said water outlet means of said removal unit and said treated water bladder tank means to facilitate flow through said recirculating line means and to facilitate maintaining of water pressure of the treated water within said water return line means.

11. An improved apparatus for treatment of well water by removal of unwanted compounds therefrom, for use with a well water supply line, as defined in claim 10 further comprising a pressure switch operatively connected to selectively initiate and terminate operation of said booster pump means, said pressure switch responsive to monitor the water pressure within said water return line to cause operation of said booster pump means responsive to a low water pressure level therein.

12. An improved apparatus for treatment of well water by removal of unwanted compounds therefrom, for use with a well water supply line, as defined in claim 1 further comprising a clear well water accumulator means positioned within said removal housing means in fluid flow communication with said removal means and said water outlet means and located therebetween, said clearwell water accumulator means being positioned to receive treated water from said removal means for accumulation thereof and supplying thereof to said water outlet means.

13. An improved apparatus for treatment of well water by removal of unwanted compounds therefrom, for use with a well water supply line, as defined in claim 12 further comprising a water level sensing means positioned within said clearwell water accumulator means to facilitate monitoring of the level of water accumulated therein.

14. An improved apparatus for treatment of well water by removal of unwanted compounds therefrom, for use with a well water supply line, as defined in claim 13 wherein said water level sensing means is responsive to sensing of a high water level within said clearwell water accumulator means to generate an alarm condition and stop all water flow through said water intake line means and said recirculating line means until said water level sensing means senses a normal low water level within said clearwell water accumulator means.

15. An improved apparatus for treatment of well water by removal of unwanted compounds therefrom, for use with a well water supply line, as defined in claim 13 wherein said water level sensing means is responsive to sensing of a low water level within said clearwell water accumulator means to allow flow through said water intake line means and said recirculating line means to facilitate flow of water into said removal means and movement into said clearwell water accumulator means.

16. An improved apparatus for treatment of well water by removal of unwanted compounds therefrom, for use with a well water supply line, as defined in claim 13 further comprising a control means operative to the sensing of a normally high water level by said water level sensing means to terminate water flow through said water intake line means and to allow water flow through said water recirculating means to facilitate further removal of undesirable volatile compounds selected from the group consisting of radon, volatile organics, hydrogen sulfide, carbon dioxide and methane from the treated water, said control means further including a time delay means operative to initiate operation responsive to said water level sensing means sensing a normally high water level and being responsive to terminate operation at a predetermined time thereafter, said control means being responsive to termination of operation of said time delay means to terminate water flow through said recirculating line means to facilitate supplying of treated water through said water return line means.

17. An improved apparatus for treatment of well water by removal of unwanted compounds therefrom, for use with a well water supply line, as defined in claim 1 further comprising a strainer means positioned within said water intake line means downstream of said water intake valve means to facilitate cleaning of the untreated well water traveling therethrough.

18. An improved apparatus for treatment of well water by removal of unwanted compounds therefrom, for use with a well water supply line, as defined in claim 1 wherein said removal means includes a mass transfer packing means therein to facilitate removal of undesirable volatile compounds selected from the group consisting of radon, volatile organics, hydrogen sulfide, carbon dioxide and methane from water passing therethrough.

19. An improved apparatus for treatment of well water by removal of unwanted compounds therefrom, constructed for use with a well water supply line, comprising:

A. a main water valve means constructed to be positioned within the well water supply line and adapted to selectively prevent fluid flow therethrough;

B. a water intake line means for fluid flow communicating with the well water supply line at a position upstream of said main water valve means and adapted to receive untreated well water supplied therefrom;

C. a water intake valve means positioned within said water intake line means to selectively allow and prevent fluid flow therethrough;

D. a one-way water intake flow control means positioned within said water intake line means to allow controlled flow of untreated water therethrough from the well water supply line and to prevent opposite flow therethrough;

E. a removal unit including:

(1) a removal housing means defining a removal chamber means therein, said removal housing means including;

(a) a water inlet means connected in fluid flow communication with respect to said water intake line means and with respect to said removal chamber means, said water inlet means being adapted to receive untreated water from said water intake line means and supply same to said removal chamber means;

(b) a water outlet means in fluid flow communication with respect to said removal chamber means and adapted to receive treated water therefrom;

(c) an air inlet means in fluid flow communication with respect to said removal chamber means and adapted to supply air thereinto;

(d) an air outlet means in fluid flow communication with respect to said removal chamber means and adapted to receive air therefrom for exhausting;

(2) a removal means positioned within removal chamber means in said removal housing means between said air inlet means and said air outlet means and also between said water inlet means and said water outlet means for treatment of water passing therebetween, said removal means adapted to remove radon and other contaminants from the untreated water supplied through said water inlet means and urge the treated water to exit through said water outlet means, said removal means also adapted to place the removed undesirable volatile compounds selected from the group consisting of radon, volatile organics, hydrogen sulfide, carbon dioxide and methane into the air supplied through said air inlet means and urge same to exit through said air outlet means, said removal means including;

(a) an aspiration means for aspirating of untreated water supplied through said water inlet means for maximizing removal of undesirable volatile compounds selected from the group consisting of radon, volatile organics, hydrogen sulfide, carbon dioxide and methane from water to air by said removal means within said removal chamber means;

(b) a baffle means positioned below said aspiration means to receive aspirated water therefrom by gravity flow and to facilitate contact between the aspirated water and the air to urge movement of undesirable volatile compounds selected from the group consisting of radon, volatile organics, hydrogen sulfide, carbon dioxide and methane from the water in the air traveling through said removal means;

(c) a mass transfer packing means positioned in fluid flow communication between said water inlet means and said water outlet means to facilitate removal of undesirable volatile compounds selected from the group consisting of radon, volatile organics, hydrogen sulfide, carbon dioxide and methane from water passing therebetween;

F. a water return line means, in fluid flow communication with said water outlet means to receive treated water therefrom, for in fluid flow communicating with respect to the well water supply line at a position downstream of said main water valve means and adapted to supply treated water thereto;

G. a water return valve means positioned within said second water line means to selectively allow and prevent fluid flow therethrough; and   H. a recirculating line means extending between said water return line means and said water intake line means, said recirculating line means being in fluid flow communication with respect to said water return line means to receive treated water therefrom and in fluid flow communication with respect to said water intake line means to supply treated water thereto;

I. a one-way recirculating flow control valve means positioned within said recirculating line means to control the amount of water flow through said recirculating line means and to allow flow of treated water from said water return line means into said recirculating line means and further into said water intake line means for further treatment thereof, said one-way recirculating flow control valve means being adapted to prevent flow from said water intake line means through said recirculating line means into said water return line means;

J. an exhaust air line means in fluid flow communication with respect to said air outlet means and adapted to receive contaminated air therefrom;

K. an exhaust fan means positioned within said exhaust air line means to facilitate movement of air therethrough and to lower pressure within said removal chamber means;

L. a treated water bladder tank means positioned within said water return line means upstream of said recirculating line means to accumulate a reservoir of treated water;

M. a booster pump means positioned within said water return line means between said water outlet means of said removal unit and said treated water bladder tank means to facilitate flow through said recirculating line means and to facilitate maintaining of water pressure of the treated water within said water return line means; and N. a pressure switch means operatively connected to selectively initiate and terminate operation of said booster pump means, said pressure switch means responsive to monitor the water pressure within said water return line means to cause operation of said booster pump means responsive to a low water pressure level therein.

20. An improved apparatus for treatment of well water by removal of unwanted compounds therefrom, constructed for use with a well water supply line, comprising:

A. a main water valve means constructed to be positioned within the well water supply line and adapted to selectively prevent fluid flow therethrough;

B. a water intake line means for fluid flow communicating with the well water supply line at a position upstream of said main water valve means and adapted to receive untreated well water supplied therefrom, said water intake line means including a strainer means therein to facilitate cleaning of untreated well water supplied therethrough;

C. a water intake valve means positioned within said water intake line means to selectively allow and prevent fluid flow therethrough;

D. a one-way water intake flow control means positioned within said water intake line means to allow controlled flow of untreated water therethrough from the well water supply line and to prevent opposite flow therethrough;

E. a removal unit including:
(1) a removal housing means defining a removal chamber means therein, said removal housing means including;

(a) a water inlet means connected in fluid flow communication with respect to said water intake line means and with respect to said removal chamber means, said water inlet means being adapted to receive untreated water from said water intake line means and supply same to said removal chamber means;
 (b) a water outlet means in fluid flow communication with respect to said removal chamber means and adapted to receive treated water therefrom;
 (c) an air inlet means in fluid flow communication with respect to said removal chamber means and adapted to supply air thereinto;
 (d) an air outlet means in fluid flow communication with respect to said removal chamber means and adapted to receive air therefrom for exhausting;

(2) a removal means positioned within removal chamber means in said removal housing means between said air inlet means and said air outlet means and also between said water inlet means and said water outlet means for treatment of water passing therebetween, said removal means adapted to remove undesirable volatile compounds selected from the group consisting of radon, volatile organics, hydrogen sulfide, carbon dioxide and methane from the untreated water supplied through said water inlet means and urge the treated water to exit through said water outlet means, said removal means also adapted to place the removed undesirable volatile compounds selected from the group consisting of radon, volatile organics, hydrogen sulfide, carbon dioxide and methane into the air supplied through said air inlet means and urge same to exit through said air outlet means, said removal means including;

(a) an aspiration means for aspirating of untreated water supplied through said water inlet means for maximizing removal of undesirable volatile compounds selected from the group consisting of radon, volatile organics, hydrogen sulfide, carbon dioxide and methane from water to air by said removal means within said removal chamber means;
 (b) a baffle means positioned below said aspiration means to receive aspirated water therefrom by gravity flow and to facilitate contact between the aspirated water and the air to urge movement of undesirable volatile compounds selected from the group consisting of radon, volatile organics, hydrogen sulfide, carbon dioxide and methane from the water in the air traveling through said removal means;

(3) a clearwell water accumulator means positioned within said removal housing means in fluid flow communication with said removal means and said water outlet means and located therebetween, said clearwell water accumulator means being positioned to receive treated water from said removal means for accumulation thereof and supplying thereof to said water outlet means;

F. a water return line means, in fluid flow communication with said water outlet means to receive treated water therefrom, for fluid flow communicating with respect to the well water supply line at a position downstream of said main water valve means and adapted to supply treated water thereto;

G. a water return valve means positioned within said second water line means to selectively allow and prevent fluid flow therethrough; and H. a recirculating line means extending between said water return line means and said water intake line means, said recirculating line means being in fluid flow communication with respect to said water return line means to receive treated water therefrom and in fluid flow communication with respect to said water intake line means to supply treated water thereto;

I. a one-way recirculating flow control valve means positioned within said recirculating line means to control the amount of water flow through said recirculating line means and to allow flow of treated water from said water return line means into said recirculating line means and further into said water intake line means for further treatment thereof, said one-way valve means being adapted to prevent flow from said water intake line means through said recirculating line means into said water return line means;

J. an exhaust air line means in fluid flow communication with respect to said air outlet means and adapted to receive contaminated air therefrom;

K. an exhaust fan means positioned within said exhaust air line means to facilitate movement of air therethrough and to lower pressure within said removal chamber means;

L. a treated water bladder tank means positioned within said water return line means upstream of said recirculating line means to accumulate a reservoir of treated water;

M. a booster pump means positioned within said water return line means between said water outlet means of said removal unit and said treated water bladder tank means to facilitate flow through said recirculating line means and to facilitate maintaining of water pressure of the treated water within said water return line means;

N. a pressure switch means operatively connected to selectively initiate and terminate operation of said booster pump means, said pressure switch means responsive to monitor the water pressure within said water return line means to cause operation of said booster pump means responsive to a low water pressure level therein;

O. a radon air removal means in fluid flow communication with respect to said air inlet means of said removal unit, said radon air removal means being adapted to remove radon from an adjacent contaminated area and supply the radon contaminated air to said air inlet means to facilitate exhausting thereof;

P. a water level sensing means positioned within said clearwell water accumulator means to facilitate monitoring of the level of water accumulated therein, said water level sensing means being responsive to sensing of a high water level within said clearwell water accumulator means to generate an alarm condition and cease water flow through said water intake line means and said recirculating line means until said water level sensing means senses a normal low water level within said clearwell water accumulator means, said water level sensing means being further responsive to sensing of a low water level within said clearwell water accumulator means to allow water flow through said water intake line means and said recirculating line means to facilitate flow of water into said removal means and movement thereof into said clearwell water accumulator means; and Q. a control means operative to the sensing of a normally high water level by said water level sensing means to terminate water flow through said water intake line means and to allow water flow through said water recirculating means to facilitate further contaminant removal from the treated water, said control means further including a time delay means operative to initiate operation responsive to said water level sensing means sensing a normally high water level and being responsive to terminate operation at a predetermined time thereafter, said control means being responsive to termination of operation of said time delay means to terminate water flow through said recirculating line means to facilitate supplying of treated water through said water return line means.

* * * * *